(12) United States Patent
Kawabata (10) Patent No.: US 7,284,145 B2
(45) Date of Patent: Oct. 16, 2007

(54) CLOCK CONTROL CIRCUIT AND INTEGRATED CIRCUIT

(75) Inventor: Shigenari Kawabata, Kanagawa (JP)

(73) Assignee: Sony Corporation, Tokyo (JP)

( * ) Notice: Subject to any disclaimer, the term of this patent is extended or adjusted under 35 U.S.C. 154(b) by 347 days.

(21) Appl. No.: 10/909,910

(22) Filed: Aug. 2, 2004

(65) Prior Publication Data
US 2005/0030077 A1    Feb. 10, 2005

(30) Foreign Application Priority Data
Aug. 6, 2003    (JP)    ............. P2003-287340

(51) Int. Cl.
*G06F 1/04*    (2006.01)

(52) U.S. Cl. ............. 713/600; 713/320; 327/199; 327/165

(58) Field of Classification Search ......... 713/320, 713/600; 327/199, 165
See application file for complete search history.

(56) References Cited

U.S. PATENT DOCUMENTS

| | | | | |
|---|---|---|---|---|
| 4,630,295 A | * | 12/1986 | Kamuro et al. ............. | 377/81 |
| 5,498,998 A | * | 3/1996 | Gehrke et al. ............. | 331/17 |
| 5,502,689 A | * | 3/1996 | Peterson et al. ............. | 368/156 |
| 6,101,609 A | * | 8/2000 | Kawasaka ............. | 713/322 |
| 6,204,707 B1 | * | 3/2001 | Hamada et al. ............. | 327/202 |
| 6,326,823 B1 | * | 12/2001 | Okui ............. | 327/160 |
| 6,822,478 B2 | * | 11/2004 | Elappuparackal ............. | 326/46 |
| 6,944,784 B2 | * | 9/2005 | Clark et al. ............. | 713/600 |
| 7,058,832 B2 | * | 6/2006 | Sachs ............. | 713/322 |
| 2003/0212917 A1 | * | 11/2003 | Yoshitomi et al. ............. | 713/400 |

FOREIGN PATENT DOCUMENTS

JP    09-284101    10/1997

* cited by examiner

*Primary Examiner*—Thomas C. Lee
*Assistant Examiner*—Vincent T Tran
(74) *Attorney, Agent, or Firm*—Robert J. Depke; Rockey, Depke & Lyons, LLC.

(57) ABSTRACT

A clock management control circuit of the present invention is a clock control circuit for supplying a valid clock signal to a target circuit in accordance with a system clock signal. When a valid input instruction signal indicating timings of data input to the target circuit changes from a disabled state to enabled state, the supply of the clock signal to the target circuit starts in accordance with the system clock signal, and if a valid output instruction signal indicating timings of data output from the target circuit changes from the enabled state to disabled state, the supply of the clock signal is stopped after a lapse of a predetermined time period set externally. The clock control circuit for supplying the valid clock to the target circuit can therefore be used in common for a variety of waveforms of a valid input flag and a valid output flag.

6 Claims, 8 Drawing Sheets

CLOCK CONTROL CIRCUIT AND INTEGRATED CIRCUIT

CROSS REFERENCES TO RELATED APPLICATIONS

The present invention claims priority to its priority document No. 2003-287340 filed in the Japanese Patent Office on Aug. 6, 2003, the entire contents of which being incorporated by reference herein.

BACKGROUND OF THE INVENTION

1. Field of the Invention

The present invention relates to a clock control circuit and an integrated circuit, and more particularly to a clock control circuit for controlling a clock signal to be supplied to a target circuit to reduce a consumption power and to an integrated circuit.

2. Description of the Related Art

A clock signal is distributed to flip-flop circuits and the like in an integrated circuit. A flip-flop circuit receives a clock signal in order to hold input data synchronously with the clock signal, and even if the data to be held in the flip-flop circuit does not change, the clock signal changes so that an unnecessary power is consumed. It is therefore desired from the viewpoint of power consumption that a clock signal should be supplied to the target circuit in an integrated circuit only during the necessary and minimum period.

A clock enabler, which is a combination of, e.g., a latch circuit and a logical gate, has been proposed in order to regulate the supply of a clock signal. In this clock enabler, an inverted signal of a clock signal is input to a gate terminal of the latch circuit and an enable signal is input to a data input terminal of the latch circuit, to obtain a corrected enable signal from a data output terminal of the latch circuit. The logical gate generates a logical sum of the corrected enable signal and clock signal to obtain a clock signal with a regulated period. A change in the state of the corrected enable signal occurs only while the clock is in a low level state, so that the waveform (duty ratio) of the clock signal generated by the logical gate is the same as that of the original clock signal. The clock signal with the regulated period can therefore be obtained without being influenced by a timing shift of the original enable signal (for example, refer to FIG. 1 of Japanese Patent Application Publication No. H09-284101).

SUMMARY OF THE INVENTION

With the above-described clock enabler, the clock signal can be supplied to the target circuit only during the necessary and minimum period, by providing the enable signal. In this case, the enable signal supplied to the clock enabler is required to be maintained in an enabled state while the target circuit operates. However, it is cumbersome to design a circuit of generating the enable signal of this type for each of target circuits.

A valid input flag indicating input data timings of a target circuit and a valid output flag indicating output data timings may take various waveforms. For example, if a target circuit receives input data at each clock input and outputs data every fourth clocks and if the supply of clocks is stopped if the valid output flag enters the disabled state, the data which should be output is left in the target circuit. It is therefore necessary to generate the enable signal by considering the waveforms of the valid input and output flags.

Accordingly, it is desirable to provide a clock control circuit for supplying a valid clock to a target circuit so as to be used in common for a variety of waveforms of a valid input flag and a valid output flag. The present invention is made in view of the above.

According to an embodiment of the present invention, there is provided a clock management control circuit. In the circuit, if a valid input instruction signal indicating timings of data input to a target circuit changes from a disabled state to enabled state, the supply of the clock signal to the target circuit starts in accordance with a system clock signal, and if a valid output instruction signal indicating timings of data output from the target circuit changes from an enabled state to disabled state, the supply of the clock signal is stopped after a lapse of a predetermined period set externally. It is therefore possible to realize the function of supplying the clock signal to the target circuit during the period from when the valid input instruction signal changes from the disabled state to enabled state to when the externally set period lapses after the valid output instruction signal changes from the enabled state to disabled state.

According to the embodiment of the present invention, advantageous effects may be provided, which allow the clock control circuit for supplying a valid clock to a target circuit to be used in common for a variety of waveforms of a valid input flag and a valid output flag.

BRIEF DESCRIPTION OF THE DRAWING

The above and other objects, features and advantages of the present invention will become more apparent from the following description of the presently preferred exemplary embodiment of the invention taken in conjunction with the accompanying drawing, in which.

DETAILED DESCRIPTION OF THE EMBODIMENTS

An embodiment of the present invention will be described in detail with reference to drawings.

Figure 1:
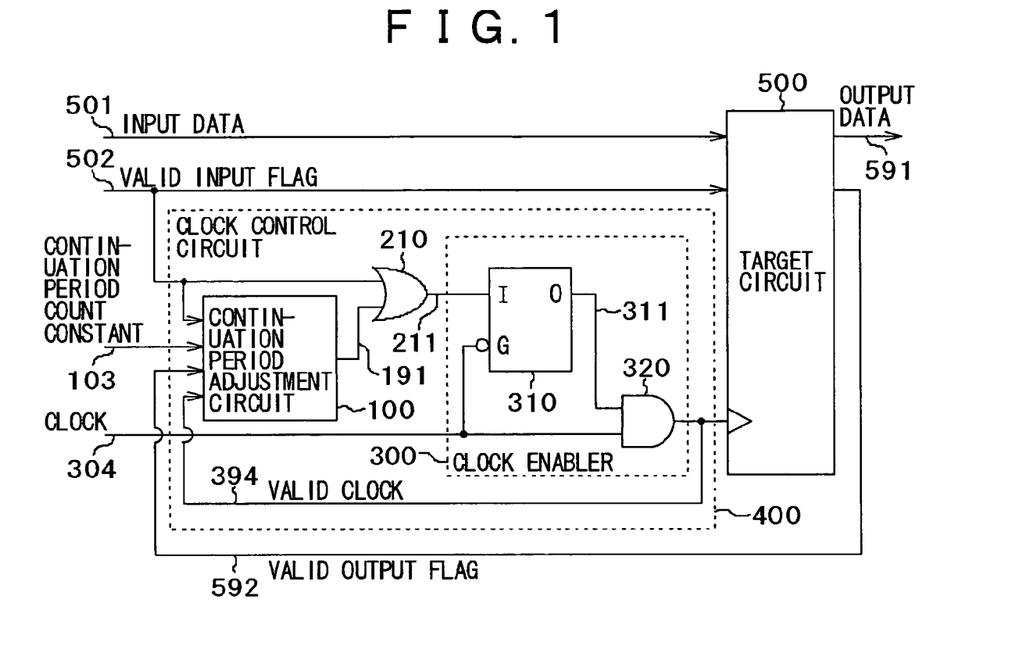
FIG. 1 is a diagram showing an example of a relation between a target circuit and a clock control circuit according to an embodiment of the present invention.

FIG. 1 is a diagram showing an example of a relation between a clock control circuit and a target circuit according to an embodiment of the present invention. A target circuit 500 receives input signals including input data 501, a valid input flag 502 and a valid clock 394 supplied from a clock control circuit 400, and delivers output signals including output data 591 and a valid output flag 592. The target circuit 500 fetches the input data 501 synchronously with the valid clock 394, and outputs the output data 591. The valid output flag 592 is a signal indicating the timings of the output data 591. These valid input flag 502 and valid output flag 592 may have a variety of waveforms as will be later described.

The clock control circuit 400 has a clock enabler 300 for supplying the valid clock 394 to the target circuit 500, a continuation period adjustment circuit 100 for generating a continuation period signal 191 and a logical sum circuit 210 for generating an enable signal (latch input signal 211) for the clock enabler 300 from the continuation period signal 191 and valid input flag 502. The valid clock 394 generated by the clock enabler 300 is supplied to the target circuit 500 and to the continuation period adjustment circuit 100. Other signals input to the continuation period adjustment circuit 100 are the valid input flag 502 input to the target circuit 500 and the valid output flag 592 output from the target circuit 500. Further, a continuation period count constant 103 is input to the continuation period adjustment circuit 100.

The continuation period signal 191 output from the continuation period adjustment circuit 100 is input to one input terminal of the logical sum circuit 210. The valid input flag 502 is input to the other input terminal of the logical sum circuit 210. The logical sum circuit 210 generates a logical sum of the continuation period signal 191 and valid input flag 502 and outputs it as the latch input signal 211. Namely, if either the continuation period signal 191 or the valid input flag 502 is in an enabled state, the latch input signal 211 is set to an enabled state, whereas if the continuation period signal 191 and valid input flag 502 are both in a disabled state, the latch input signal 211 is set to the disabled state.

The clock enabler 300 has a latch circuit 310 and a logical product circuit 320. The latch circuit 310 latches the latch input signal 211 by using an inverted signal of the clock 304 as a gate signal. Namely, the clock enabler 300 outputs the latch input signal 211 itself as a latch output signal 311 if the clock 304 takes a low level, whereas it outputs as the latch output signal 311 a latch input signal 211 immediately before the low level changes to a high level if the clock 304 takes the high level. The logical product circuit 320 generates a logical product of the latch output signal 311 and clock 304, and outputs it as the valid clock 394. Namely, if the latch output signal 311 is in the enabled state, the logical product circuit 320 outputs the clock 304 itself as the valid clock 394, whereas if the latch output signal 311 is in the disabled state, it does not output the clock 304 but outputs the signal in the disabled state as the valid clock 394.

Figure 2:
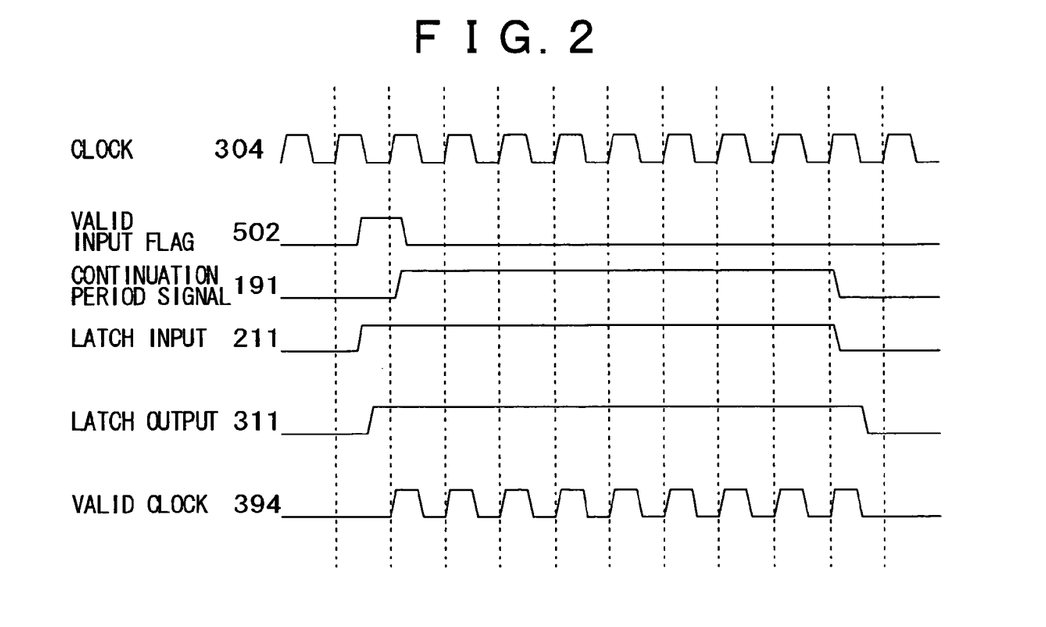
FIG. 2 is a diagram showing an example of the timings of a clock enabler 300 according to an embodiment of the present invention.

FIG. 2 is a diagram showing an example of timings of the clock enabler 300 according to the embodiment of the present invention. The latch input signal 211 is generated by the logical sum circuit 210 as the logical sum of the valid input flag 502 and continuation period signal 191, as described above. Therefore, the latch input signal 211 may rise at an indefinite position depending upon the timing of the valid input flag 502. This is also applicable to the fall timing. If the logical product of this latch input signal 211 itself and clock 304 is generated, there is the possibility that the signal changes at the intermediate point while the clock takes the high level, and an unintended pulse may be generated.

To avoid this, in the clock enabler circuit 300, the latch circuit 310 corrects this latch input signal 211 and generates the latch output signal 311. This latch output signal 311 is held while the clock 304 takes the high level, and changes only while the clock 304 takes the low level. Therefore, as the logical product with the clock 304 is generated by using this latch output signal 311, the signal will not change at the intermediate point while the clocks takes the high level.

Figure 3A:
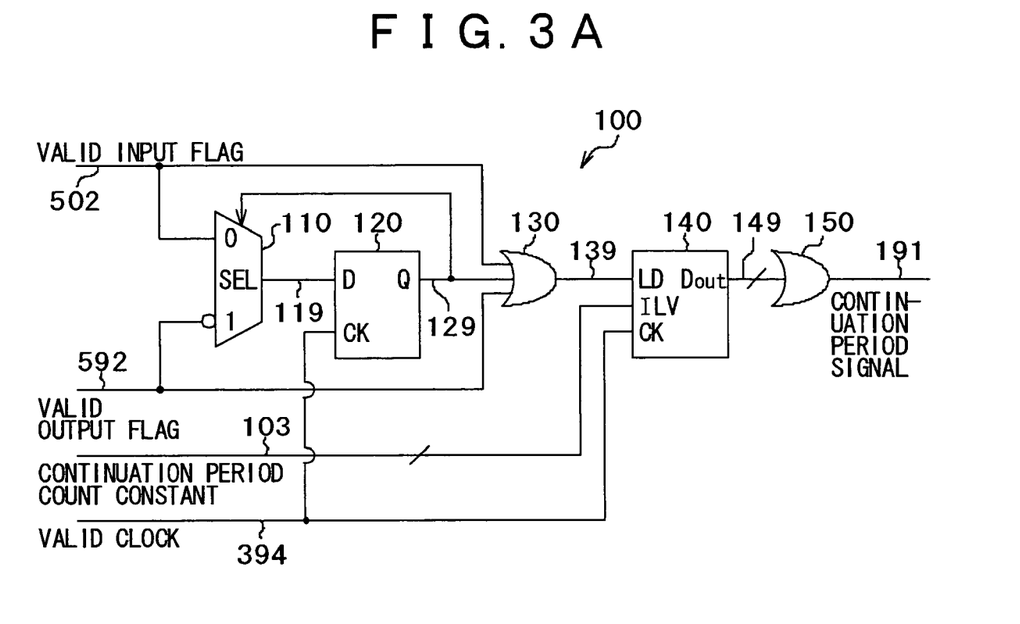
FIG. 3 is a diagram showing an example of the structure of a continuation period adjustment circuit 100 according to an embodiment of the present invention.

FIG. 3(*a*) is a diagram showing an example of the structure of the continuation period adjustment circuit 100 according to the embodiment of the present invention. The continuation period adjustment circuit 100 has a selector 110, a flip-flop 120, a logical sum circuit 130, a counter 140 and a logical sum circuit 150. The continuation period adjustment circuit 100 receives input signals including the valid input flag 502, valid output flag 592, continuation period count constant 103 and valid clock 394, and outputs the continuation period signal 191.

The selector 110 outputs the valid input flag 502 as a select signal 119 if an enabled state signal 129 is in the disabled state, and outputs an inverted signal of the valid output flag 592 as the select signal if the enabled state signal 129 is in the enabled state. The flip-flop 120 holds the select signal 119 immediately if the level of the valid clock 394 changes from the low level to high level, and outputs it as the enabled state signal 129. Therefore, if the valid input flag 502 enters the enabled state while the enabled state signal 129 is in the disabled state, the enabled state signal 129 enters the enabled state at the rising edge of the next valid clock 394. If the valid output flag 592 is in the disabled state while the enabled state signal 129 is in the enabled state, the enabled state signal 129 maintains the enabled state, and if the valid output flag 592 enters the enabled state thereafter, the enabled state signal 129 enters the disabled state at the rising edge of the next valid clock 394.

The logical sum circuit 130 generates a logical sum of the valid input flag 502, valid output flag 592 and enabled state signal 129, and outputs it as a counter setting signal 139. Namely, if any one of the valid input flag 502, valid output flag 592 and enabled state signal 129 is in the enabled state, the counter setting signal 139 is set to the enabled state, whereas if all the valid input flag 502, valid output flag 592 and enabled state signal 129 are in the disabled state, the counter setting signal 139 is set to the disabled state.

The counter 140 decrements an internally held value synchronously with the valid clock 394, and outputs the result as a counter output signal 149. If the counter setting signal 139 is in the enabled state, the counter 140 holds therein the continuation period count constant 103 immediately before the level of the valid clock 394 changes from the low level to high level.

The logical sum circuit 150 generates a logical sum of all bits of the counter output signal 149, and outputs it as the continuation period signal 191. Namely, the logical sum circuit 150 sets the continuation period signal 191 to the disabled state if the counter output signal 149 is zero, and sets the continuation period signal 191 to the enabled state if the counter output signal 149 indicates non-zero (does not indicate zero).

Figure 3B:
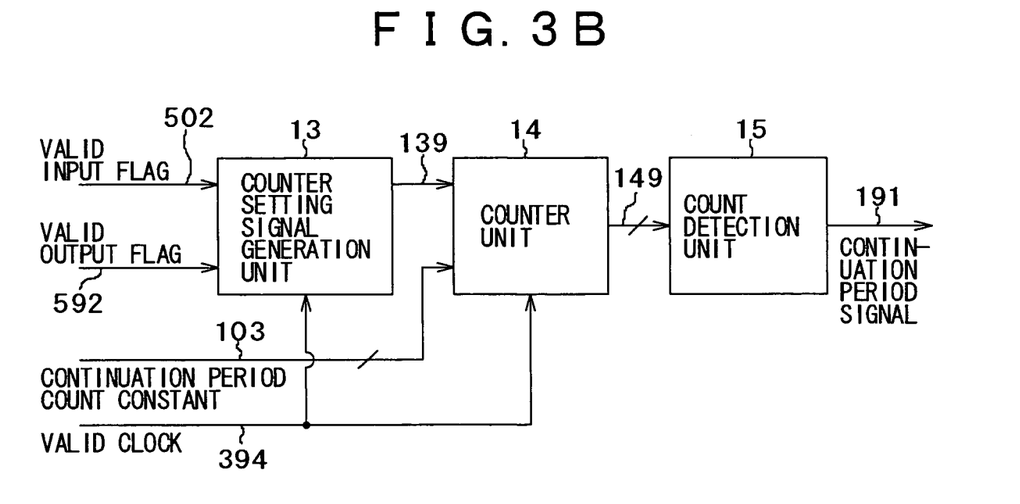

FIG. 3(b) is a diagram showing the functional structure of the continuation period adjustment circuit 100 shown in FIG. 3(a). A block constituted of the selector 110, flip-flop 120 and logical sum circuit 130 functions as a counter setting signal generation unit 13. Namely, the counter setting signal generation unit 13 sets the counter setting signal 139 to the enabled state, during the period from if the valid input flag 502 changes from the disabled state to enabled state to if the valid output flag 592 changes from the disabled state to enabled state and resumes the disabled state.

A counter unit 14 corresponds to the counter 140, stores therein the continuation period constant 103 if the counter setting signal 139 is in the enabled state immediately before the valid clock 394 changes its level from the low level to high level, and decrements the internal value each time the valid clock 394 changes its level from the low level to high level.

A count detection unit 15 corresponds to the logical sum circuit 150, and sets the continuation period signal 191 to the enabled state during the period from if the continuation period count constant 103 is set to the counter unit 14 to if the number corresponding to the continuation period constant 103 is counted up.

Figure 4:
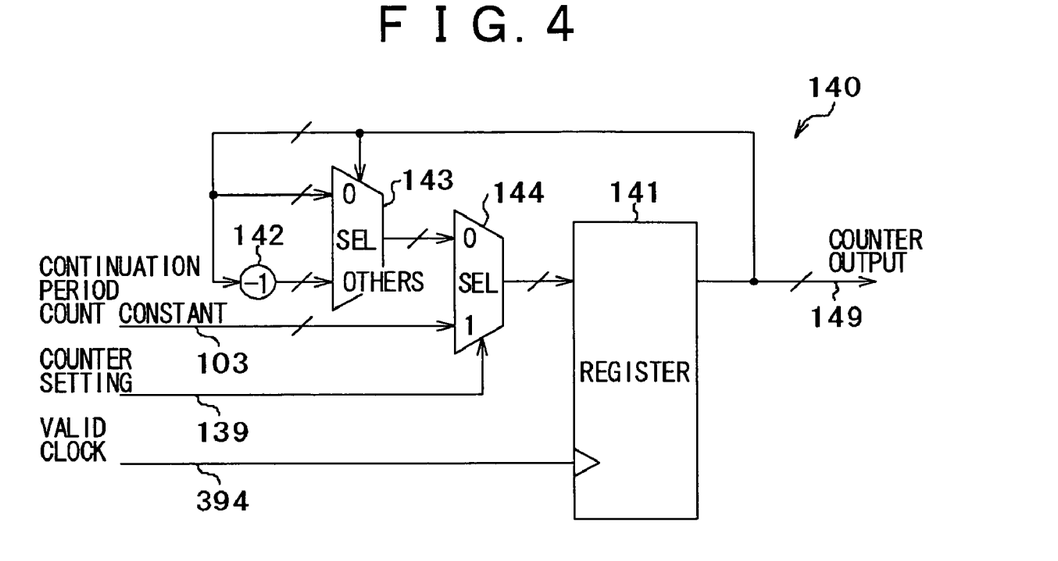
FIG. 4 is a diagram showing an example of the structure of a counter 140 according to an embodiment of the present invention.

FIG. 4 is a diagram showing an example of the structure of the counter 140 according to the embodiment of the present invention. The counter 140 has a register 141 for holding its internal state, a subtracter 142, and selectors 143 and 144. The counter 140 receives input signals including the continuation period count constant 103, counter setting signal 139 and valid clock 394, and outputs the counter output signal 149.

The register 141 holds the internal state of the counter 140, and the contents held in the register 141 are output as the counter output signal 149 from the counter 140. The register 141 holds therein an output signal of the selector 144 immediately before the valid clock 394 changes its level from the low level to high level.

The subtracter 142 is a circuit for subtracting "1" from the internal state (counter output signal 149) held in the register 141. The selector 143 selects the counter output signal 149 while the counter output signal 149 indicates zero, and selects an output of the subtracter 142 while the counter output signal 149 indicates non-zero (does not indicate zero). Therefore, an output of the selector 143 indicates zero if the counter output signal 149 indicates zero, whereas if the counter output signal 149 indicates non-zero (does not indicate zero), an output of the selector 143 is the counter output signal 149 subtracted by "1".

The selector 144 selects an output of the selector 143 if the counter setting signal 139 is in the disabled state, and selects the continuation period count constant 103 if the counter setting signal 139 is in the enabled state. Therefore, if the counter setting signal 139 is in the disabled state while the counter output signal 149 indicates non-zero (does not indicate zero), the value immediately before and subtracted by "1" is set to the register 141, whereas if the counter setting signal 139 is in the enabled state, the continuation period count constant 103 is set to the register 141.

Next, with reference to drawings, description will be made on the waveforms of the valid input flag 502 and valid output flag 592 according to the embodiment of the present invention.

Figure 5:
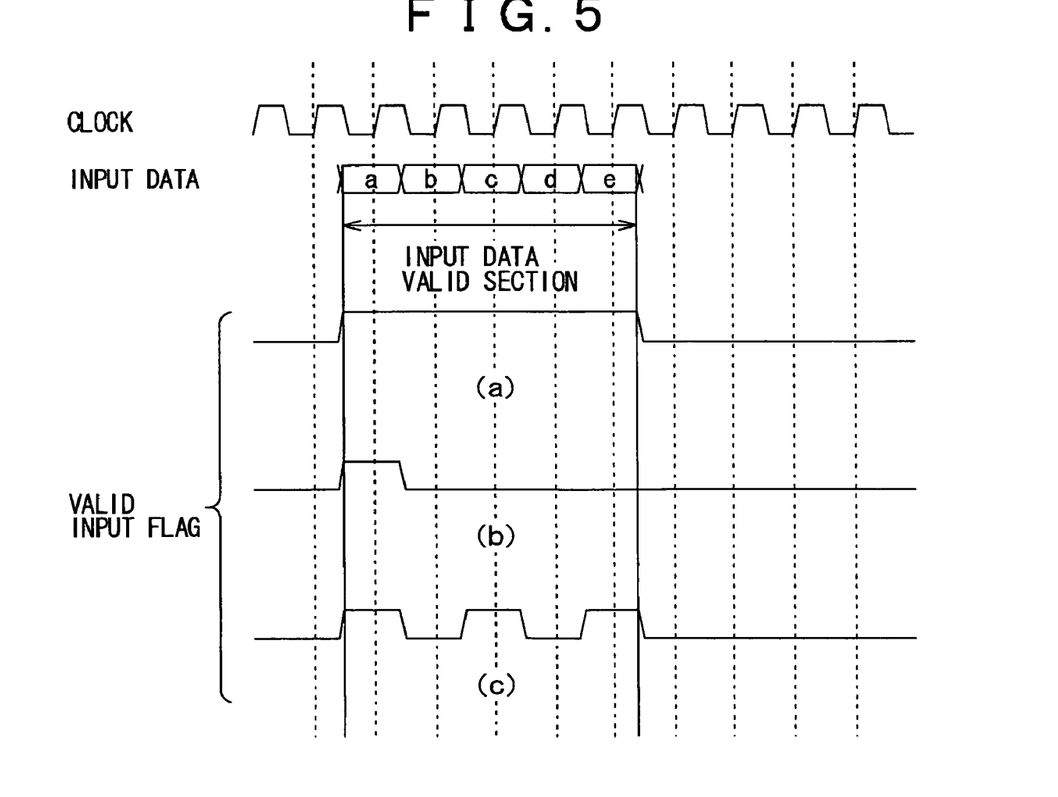
FIG. 5 is a diagram illustrating the relation between input data and a valid input flag according to an embodiment of the present invention.

FIG. 5 is a diagram showing the relation between input data and the valid input flag according to the embodiment of the invention. It is assumed that five pieces of data are continuously input as input data and three patterns (a) to (c) are considered as the valid input flags. The pattern (a) always indicates the enabled state of an input data valid section. The pattern (b) indicates the enabled state only while the top data piece is input in the input data valid section. The pattern (c) repeats the enable state and disabled state every one clock period in the input data valid section.

The pattern (a) is the most typical pattern which is often used for the structure that a valid bit is held at each stage of pipe lines of a target circuit. The pattern (b) is used for indicating the top data piece and often used if input data of a target circuit is collectively processed. The pattern (c) is used for fetching input data at a constant interval.

As described above, the continuation period adjustment circuit 100 refers to the state of the valid output flag 592 after the valid input flag 502 enters once the enabled state. Therefore, a normal operation can be guaranteed if the valid input flag is in the enabled state at least while the top data piece is input.

Figure 6:
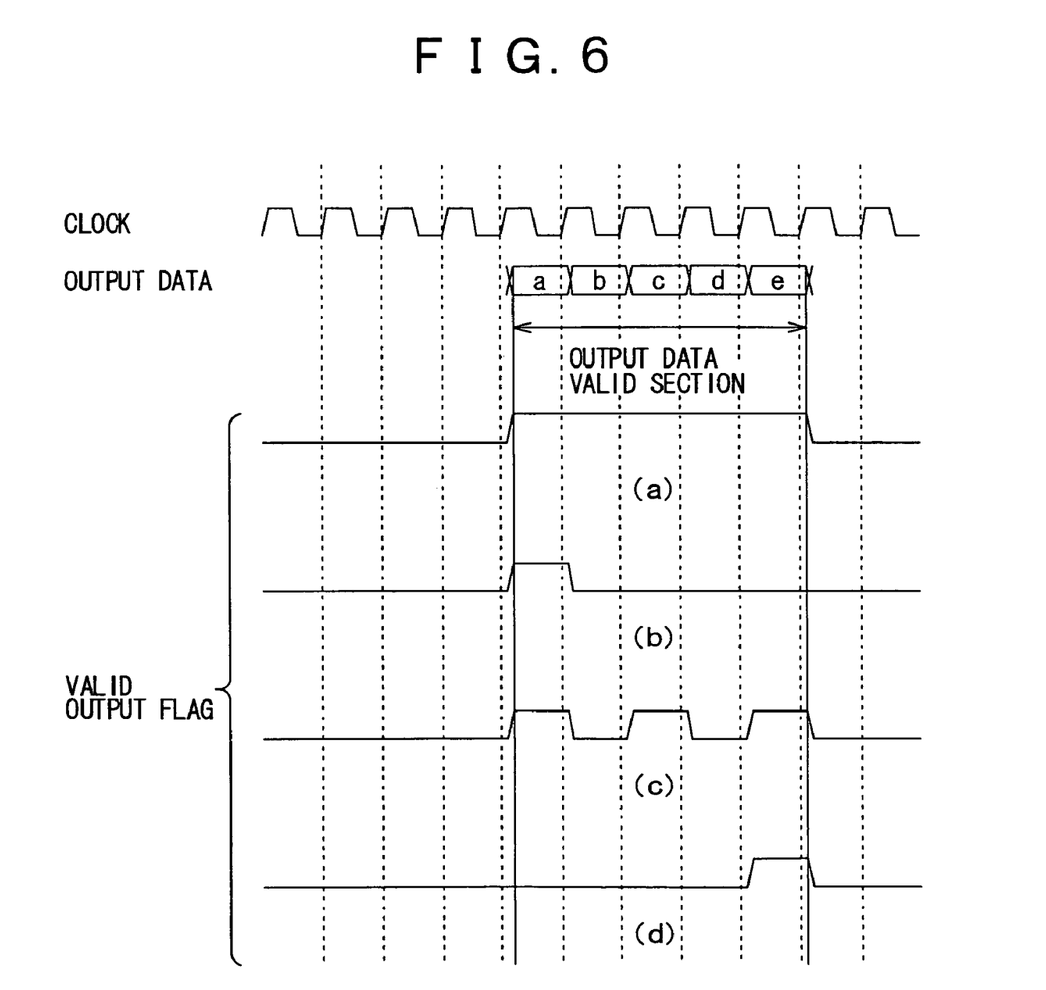
FIG. 6 is a diagram illustrating the relation between output data and a valid output flag according to an embodiment of the present invention.

FIG. 6 is a diagram showing the relation between output data and the valid output flag according to the embodiment of the invention. It is assumed that five pieces of data are continuously output as output data and four patterns (a) to (d) are considered as the valid output flags. The pattern (a) always indicates the enabled state of an output data valid section. The pattern (b) indicates the enabled state only while the top data piece is output in the input data valid section. The pattern (c) repeats the enable state and disabled state every one clock period in the output data valid section. The pattern (d) indicates the enabled state only while the last data piece is output in the output data valid section.

The pattern (a) is the most typical pattern which is often used for the structure that a valid bit is held at each stage of pipe lines of a target circuit. The pattern (b) is used for indicating the top data piece and often used if output data of a target circuit is collectively processed. The pattern (c) is used for outputting data at a constant interval. The pattern (d) is used for indicating the last data piece.

As described above, in the continuation period adjustment circuit 100, after the valid output flag 592 changes its state from the enable state to disabled state, the continuation period count constant 103 held in the register 141 of the counter 140 is decremented each time by "1" and the continuation period signal 191 maintains the enabled state until the counter output signal 199 becomes zero. Therefore, in the cases of the patterns (a) and (d), by setting "1" as the continuation period count constant 103, it becomes possible to control to stop the supply of the clock after the necessary clock 394 is supplied to the target circuit 500.

In the case of the pattern (b), it is necessary to set a value of "2" or larger to the continuation period count constant 103. For example, if the pattern (b) is used, "4" is set to the continuation period count constant 103.

In the case of the pattern (c), if the valid output flag enters the enabled state every "n"-th clocks (n is a natural number), it is necessary to set "n+1" to the continuation period count constant 103. For example, in the case of the pattern (c), "2" is set to the continuation period count constant 103.

Figure 7:
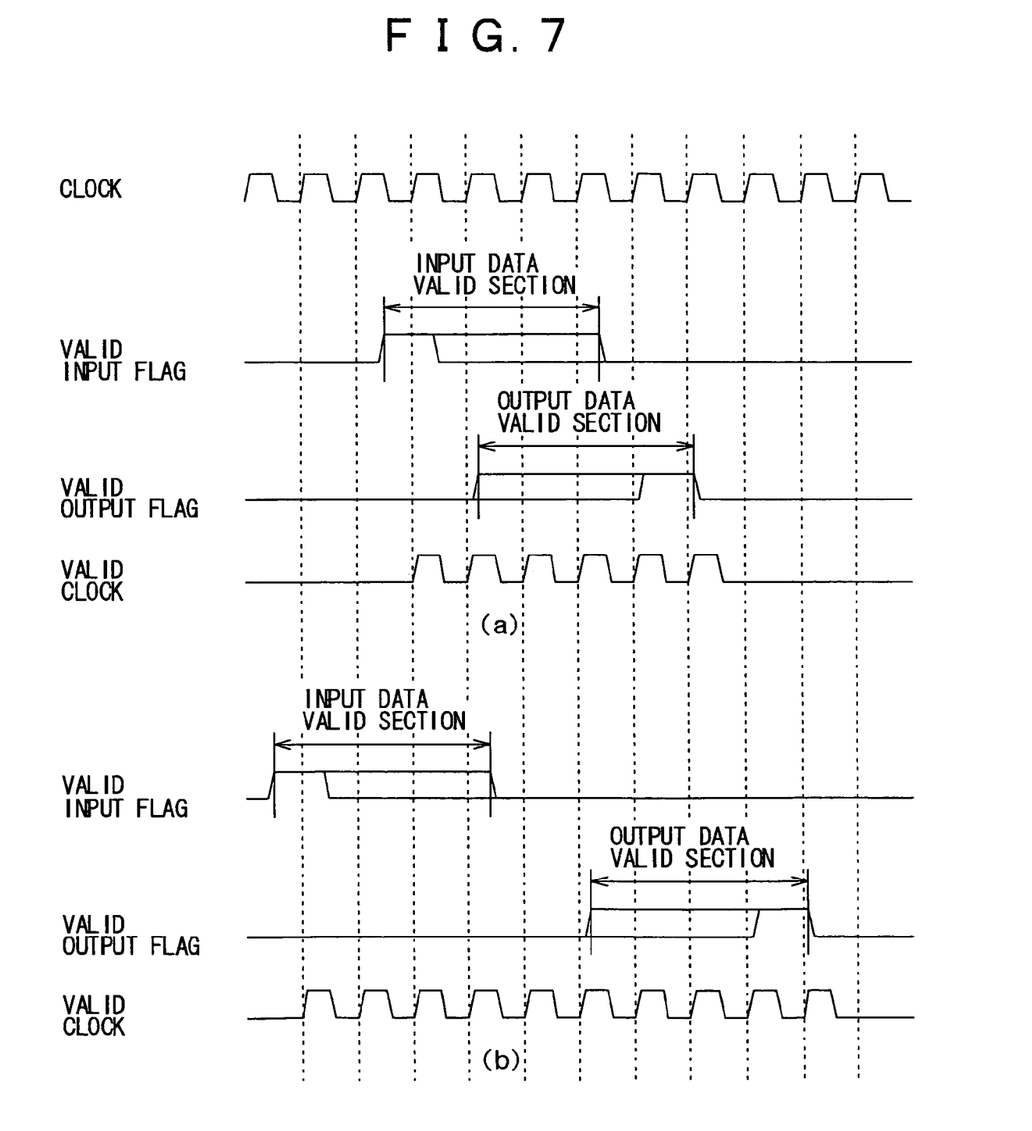
FIG. 7 is a diagram illustrating the relation between an input data valid section and an output data valid section according to an embodiment of the present invention.

FIG. 7 is a diagram showing the relation between the input data valid section and output data valid section according to the embodiment of the present invention. In the case (a), the input data valid section overlaps the output data valid section. In this case, for example, if the valid input flag and valid output flag have the patterns (a) shown in FIGS. 5 and 6, the enable signal of the clock enabler can be generated from a logical sum of the valid input flag and valid output flag without using the continuation period adjustment circuit 100 of the embodiment of the present invention. However, if the valid input flag has the pattern (a) shown in FIG. 5 and the valid output flag has the pattern (d) shown in FIG. 6, the valid clock cannot be supplied properly if simply a logical sum of both is generated. According to the embodiment of the present invention, in the case (a) shown in FIG. 7, even if the waveforms of the valid input flag and valid output flag are any ones of those patterns shown in FIGS. 5 and 6, the valid clock can be supplied properly.

In the case (b) shown in FIG. 7, there is a gap between the input data valid section and output data valid section. In this case, even if the waveforms of the valid input flag and valid output flag have any ones of those patterns shown in FIGS. 5 and 6, the valid clock cannot be supplied properly if simply a logical sum of both is generated. According to the embodiment of the present invention, in the case (b) shown in FIG. 7, even if the waveforms of the valid input flag and valid output flag are any ones of those patterns shown in FIGS. 5 and 6, the valid clock can be supplied properly.

Next, with reference to drawings, description will be made on the operation of the continuation period adjustment circuit 100 according to the embodiment of the present invention.

Figure 8:
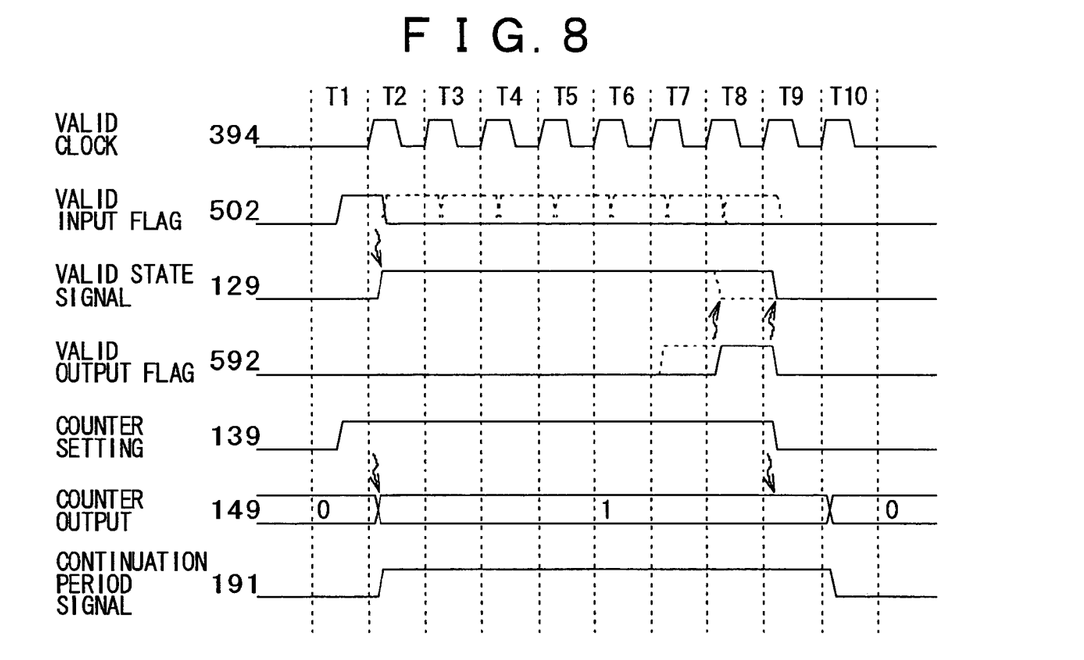
FIG. 8 is a diagram showing an example of the operation timings of the continuation period adjustment circuit 100 if a continuation period count constant 103 is "1" according to an embodiment of the present invention.

FIG. 8 is a diagram showing an example of the operation timings of the continuation period adjustment circuit 100 if the continuation period count constant 103 is "1". In a period T1 as the valid input flag 502 changes from the disabled state to enabled state, the enabled state signal 129 enters the enabled state at the rise timing of the next valid clock 394. Since the counter setting signal 139 is a logical sum of the valid input flag 502, valid output flag 592 and enabled state signal 129, the counter setting signal 139 also enters the enabled state as the valid input flag 502 changes from the disabled state to enabled state. In response to this, "1" of the continuation period count constant 103 is set to the register 141 of the counter 140 at the rise timing of the valid clock 394 in a period T2. Since the counter output signal 149 of the counter 140 becomes "1" or non-zero, the continuation period signal 191 enters the enabled signal.

In a period T8 as the valid output flag 592 changes from the disabled state to enabled state, the enabled state signal 129 enters the disabled state at the rise timing of the valid clock 394 in a period T9. The counter setting signal 139 therefore enters the disabled state in the period T9. In this example, even if the timing if the valid output flag 592 enters the enabled state is in a period T7 one period earlier (indicated by a broken line), since as described above the counter setting signal 139 is a logical sum of the valid input flag 502, valid output flag 592 and enabled state signal 129, the counter setting signal 139 will not change.

In the period T9 as the counter setting signal 139 changes from the enabled state to disabled state, the counter 140 starts counting down and the counter output signal 149 becomes zero at the rise timing of the valid clock 394 in a period T10, because the value set to the register 141 is "1". In response to this, the continuation period signal 191 changes from the enabled state to disabled state. The enable signal (latch input signal 211) to be supplied to the clock enabler 300 therefore enters the disabled state so that the supply of the valid clock 394 stops after a period T10.

Figure 9:
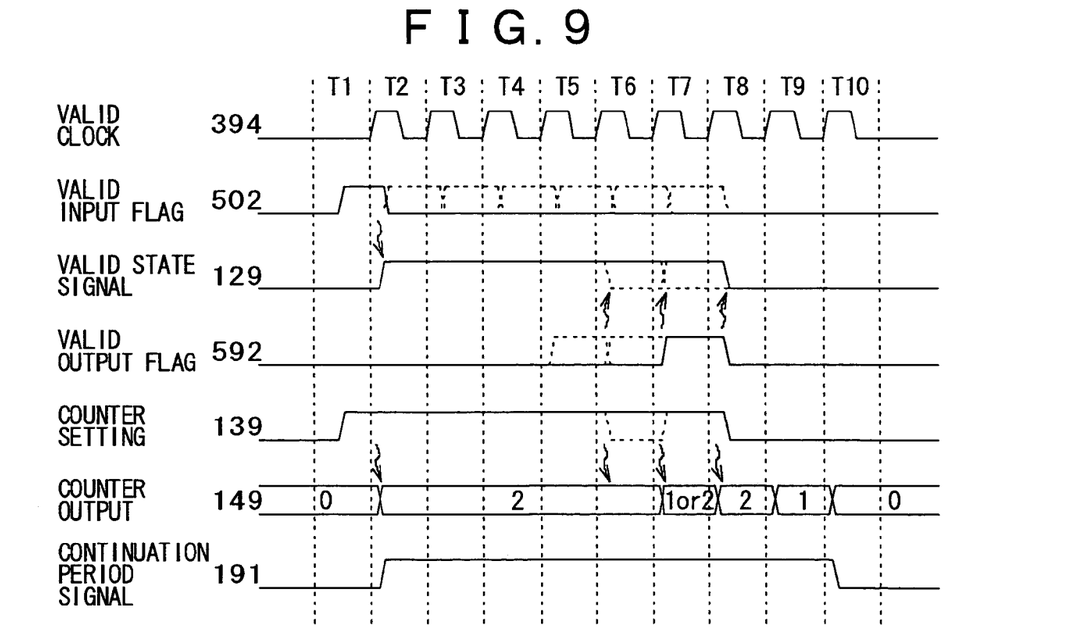
FIG. 9 is a diagram showing an example of the operation timings of the continuation period adjustment circuit 100 if a continuation period count constant 103 is "2" according to an embodiment of the present invention.

FIG. 9 is a diagram showing an example of the operation timings of the continuation period adjustment circuit 100 if the continuation period count constant 103 is "2". In a period T1 as the valid input flag 502 changes from the disabled state to enabled state, the enabled state signal 129 enters the enabled state at the rise timing of the next valid clock 394. Since the counter setting signal 139 is a logical sum of the valid input flag 502, valid output flag 592 and enabled state signal 129, the counter setting signal 139 also enters the enabled state as the valid input flag 502 changes from the disabled state to enabled state. In response to this, "2" of the continuation period count constant 103 is set to the register 141 of the counter 140 at the rise timing of the valid clock 394 in a period T2. Since the counter output signal 149 of the counter 140 becomes "2" or non-zero, the continuation period signal 191 enters the enabled signal.

In a period T7 as the valid output flag 592 changes from the disabled state to enabled state, the enabled state signal 129 enters the disabled state at the rise timing of the valid clock 394 in a period T8. The counter setting signal 139 therefore enters the disabled state in the period T8.

As the counter setting signal 139 changes from the enabled state to disabled state in the period T8, the counter 140 starts counting down and the counter output signal 149 becomes zero at the rise timing of the valid clock 394 in a period T10, because the value set to the register 141 is "2". In response to this, the continuation period signal 191 changes from the enabled state to disabled state. The enable signal (latch input signal 211) to be supplied to the clock enabler 300 therefore enters the disabled state so that the supply of the valid clock 394 stops after the period T10.

For example, if the timing if the valid output flag 592 enters changes from the disabled state to enabled state is in a period T5 (indicated by a broken line), the enabled state signal 129 enters the disabled state at the rise timing of the valid clock 394 in a period T6. Even in this case, if the valid output flag 592 maintains the enabled state in the period T6, the counter setting signal 139 will not change. This is also true for the case that the valid output flag 592 changes from the disabled state to enabled state in the period T6. On the other hand, if the valid output flag 592 changes from the disabled state to enabled state in the period T5 and resumes the disabled state in the period T6, the counter setting signal 139 enters the disabled state in the period T6 so that the counter 140 starts counting down from the period T6. Also in this case, the counter output signal 149 will not reach zero so long as the counter setting signal 139 takes the enabled state in a period T7. As a result, as described above, the valid clock 394 is supplied to the period T10.

Figure 10:
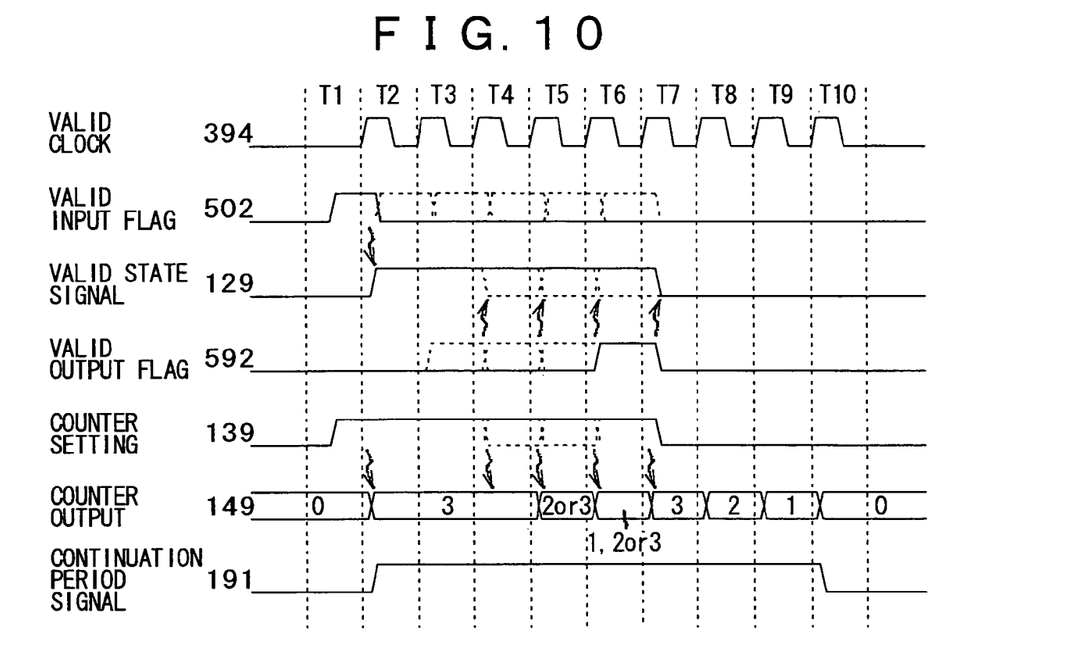
FIG. 10 is a diagram showing an example of the operation timings of the continuation period adjustment circuit 100 if a continuation period count constant 103 is "3" according to an embodiment of the present invention.

FIG. 10 is a diagram showing an example of the operation timings of the continuation period adjustment circuit 100 if the continuation period count constant 103 is "3". In a period T1 as the valid input flag 502 changes from the disabled state to enabled state, the enabled state signal 129 enters the enabled state at the rise timing of the next valid clock 394. Since the counter setting signal 139 is a logical sum of the valid input flag 502, valid output flag 592 and enabled state signal 129, the counter setting signal 139 also enters the enabled state as the valid input flag 502 changes from the disabled state to enabled state. In response to this, "3" of the continuation period count constant 103 is set to the register 141 of the counter 140 at the rise timing of the valid clock 394 in a period T2. Since the counter output signal 149 of the counter 140 becomes "3" or non-zero, the continuation period signal 191 enters the enabled signal.

In a period T6 as the valid output flag 592 changes from the disabled state to enabled state, the enabled state signal 129 enters the disabled state at the rise timing of the valid clock 394 in a period T7. The counter setting signal 139 therefore enters the disabled state in the period T7.

As the counter setting signal 139 changes from the enabled state to disabled state in the period T7, the counter 140 starts counting down and the counter output signal 149 becomes zero at the rise timing of the valid clock 394 in a period T10, because the value set to the register 141 is "3". In response to this, the continuation period signal 191 changes from the enabled state to disabled state. The enable signal (latch input signal 211) to be supplied to the clock enabler 300 therefore enters the disabled state so that the supply of the valid clock 394 stops after the period T10.

For example, if the timing if the valid output flag 592 changes from the disabled state to enabled state is in a period T3 (indicated by a broken line), the enabled state signal 129 enters the disabled state at the rise timing of the valid clock 394 in a period T4. Even in this case, if the valid output flag 592 maintains the enabled state in the period T4, the counter setting signal 139 will not change. This is also true for the case that the valid output flag 592 changes from the disabled state to enabled state in the period T4.

On the other hand, if the valid output flag 592 changes from the disabled state to enabled state in the period T3 and resumes the disabled state in the period T4, the counter setting signal 139 enters the disabled state in the period T4 so that the counter 140 starts counting down from the period T4. Further, if the valid output flag 592 changes from the disabled state to enabled state in the period T4 and resumes the disabled state in a period T5, the counter setting signal 139 enters the disabled state in the period T5 so that the counter 140 starts counting down from the period T6. Also in these cases, the counter output signal 149 will not reach zero so long as the counter setting signal 139 takes the enabled state in a period T6. As a result, as described above, the valid clock 394 is supplied to the period T10.

Next, with reference to drawings, description will be made on the operation if a target circuit 500 is connected, according to the embodiment of the present invention.

Figure 11:
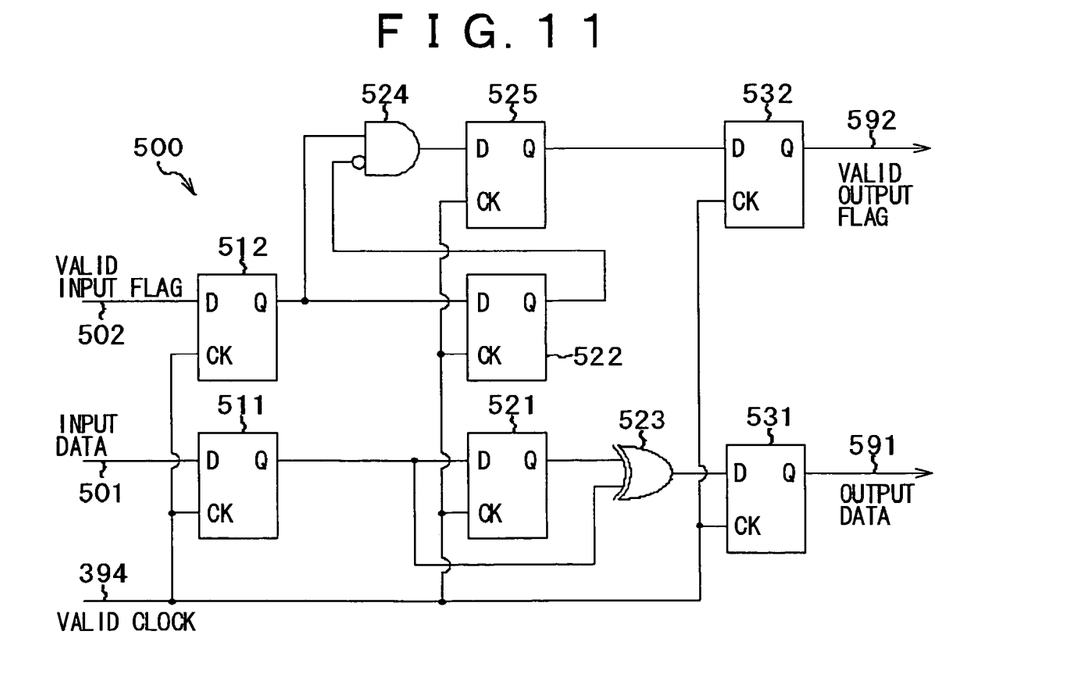
FIG. 11 is a diagram showing an example of the structure of a target circuit 500 to be connected to the clock control circuit 400 according to an embodiment of the present invention.

FIG. 11 is a diagram showing an example of the structure of the target circuit 500 to be connected to the clock control circuit 400 of the embodiment of the present invention. This target circuit 500 has seven flip-flops 511, 512, 521, 522, 525 and 531 operating synchronously with the valid-clock 394, an exclusive logical sum circuit 523 and a logical product circuit 524. Of the seven flip-flops, the flip-flops 511, 521 and 531 constitute a data pipeline and the flop-flops 512, 522, 525 and 532 constitute a valid flag pipeline.

In the data pipeline, input data is input to the flip-flop 511, an output of the flip-flop 511 is input to the flip-flop 521, and an output of the exclusive logical sum circuit 523 is input to the flip-flop 531. The exclusive logical sum circuit 523 generates an exclusive logical sum of an output of the flip-flop 511 and an output of the flip-flop 521.

In the valid flag pipeline, the valid input flag 502 is input to the flip-flop 512, an output of the flip-flop 512 is input to the flip-flop 522, an output of the logical product circuit 524 is input to the flip-flop 525, and an output of the flip-flop 525 is input to the flip-flop 532. The logical product circuit 524 generates a logical product of an output of the flip-flop 512 and an inverted output of the flip-flop 522.

Figure 12:
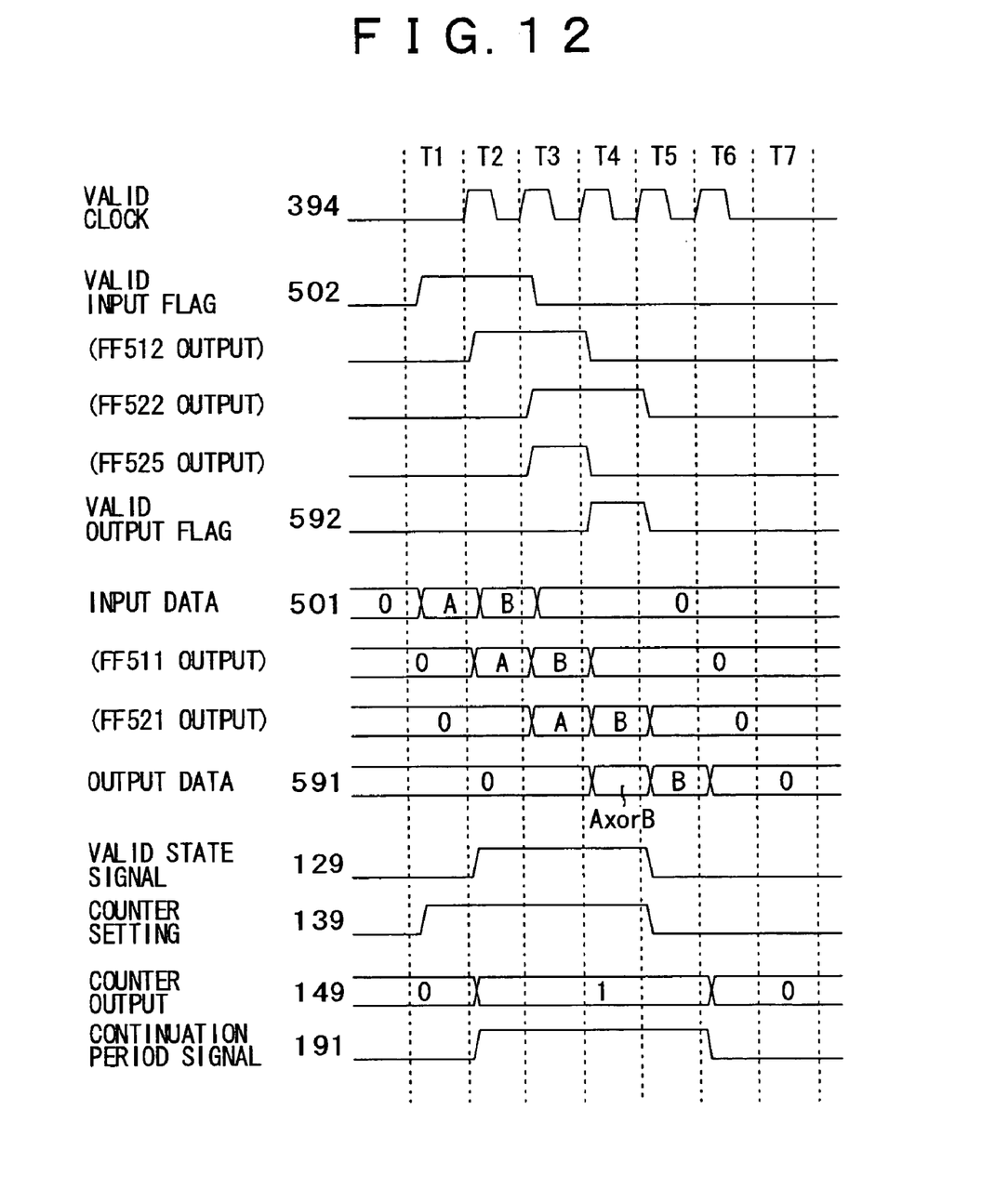
FIG. 12 is a diagram showing an example of the operation timings if a target circuit 500 shown in FIG. 11 is connected to the clock control circuit 400 according to an embodiment of the present invention.

FIG. 12 is a diagram showing an example of the operation timings as the target circuit 500 of FIG. 11 is connected to the clock control circuit 400 of the embodiment of the present invention. In this example, input data 501 "A" is input in a period T1 and input data 501 "B" is input in a period T2. During the periods T1 and T2, the valid input flag 502 is in the enabled state.

First, as the valid input flag 502 enters the enabled state in the periods T1 and T2, an output of the flip-flop 512 enters the enabled state in the periods T2 and T3. An output of the flip-flop 522 enters the enabled state in the periods T3 and T4. Since the logical product circuit 524 is connected to an input part of the flip-flop 525, an output of the flip-flop 525 enters the enabled state in the period T3. Therefore, the valid output flag 592 which is an output of the flip-flop 525 enters the enabled state in the period T4.

On the other hand, as the input data 501 "A" and "B" are input in the periods T1 and T2, respectively, the flip-flop 511 outputs the data "A" and "B" in the periods T2 and T3, respectively. The flip-flop 521 outputs the data "A" and "B" in the periods T3 and T4, respectively. Since the exclusive logical sum circuit 523 is connected to an input part of the flip-flop 531, the flip-flop 531 outputs an exclusive logical sum of the data "A" and "B" and the data "B" as output data 591.

As the valid input flag 502 enters the enabled state in the period T1, the enabled state signal 129 enters the enabled state in the period T2. As the valid output flag 592 enters the enabled state in the period T4, the enabled state signal 129 enters the disabled state in a period T5. Therefore, the counter setting signal 139 as well as the valid input flag 502 enters the enabled state in the period T1, and the counter setting signal 139 as well as the enabled state signal 129 enters the disabled state in the period T5.

As the counter setting signal 139 enters the enabled state in the period T1, the continuation period count constant 103 is set to the counter 140 in the period T2. In this example, "1" is used as the continuation period count constant 103. Therefore, the continuation period signal 191 enters the enabled state in the period T2. Since the counter setting signal 139 enters the disabled state in the period T5, the counter 140 starts counting down. The counter output signal 149 therefore becomes zero during a period T6. The continuation period signal 191 therefore enters the disabled state in the period T6. In this example, therefore, the valid clock 394 is supplied during the periods T2 to T6.

As above, according to the embodiment of the present invention, the continuation period adjustment circuit 100 generates the continuation period signal 191 matching the continuation period count constant 103, and the enable signal (latch input signal 211) based upon the continuation period signal 191 is supplied to the clock enabler 300. It is therefore possible to realize the clock control circuit 400 which can deal with a variety of waveforms of the valid input flag 502 and valid output flag 592.

In the embodiment of the present invention, although the clock rising edge is used as a trigger for each flip-flop and latch, a clock falling edge may be used. Further, although the positive logic is adopted as the polarity of the logical circuit in the embodiment of the present invention, the negative logic may be used as the polarity.

The embodiment of the present invention is an illustrative example for embodying the present invention. Although the embodiment has the correspondence with each invention specifying item described in the section of "WHAT IS CLAIMED IS", the invention is not limited only thereto, but various modifications are possible in the range not departing from the gist of the present invention.

Namely, in a first embodiment of the present invention, the target circuit corresponds, for example, to the target circuit 500; the valid input instruction signal corresponds, for example, to the valid input flag 502; the system clock signal corresponds, for example, to the clock 304; the clock signal corresponds, for example, to the valid clock 394; the valid input instruction signal corresponds, for example, to the valid output flag 592; the continuation period count constant corresponds, for example, to thee continuation period count constant 103; and the clock control circuit corresponds, for example, to the clock control circuit 400.

In a second embodiment of the present invention: the system clock signal corresponds, for example, to the clock 304; the target circuit corresponds, for example, to the target circuit 500; the valid clock signal corresponds, for example, to the valid clock 394; the clock control circuit corresponds, for example, to the clock control circuit 400; the valid input instruction signal corresponds, for example, to the valid input flag 502; the valid output instruction signal corresponds, for example, to the valid output flag 592; the counter setting signal corresponds, for example, to the counter setting signal 139; the counter setting signal generation means corresponds, for example, to the counter setting signal generation unit 13; the continuation period count constant corresponds, for example, to the continuation period count constant 103; the continuation period signal corresponds, for example, to the continuation period signal 191; the counter means corresponds, for example, to the counter unit 14; the count detection means corresponds, for example, to the count detection unit 15; the latch input signal corresponds, for example, to the latch input signal 211; the enable signal generation means corresponds, for example, to the logical sum circuit 210; the latch output signal corresponds, for example, to the latch output signal 311; the latch means corresponds, for example, to the latch circuit 310; and the valid clock output means corresponds, for example, to the logical product circuit 320.

In a third embodiment of the present invention: the system clock corresponds, for example, to the clock 304; the target circuit corresponds, for example, to the target circuit 500; the valid clock signal corresponds, for example, to the valid clock 394; the clock control circuit corresponds, for example, to the clock control circuit 400; the valid input instruction signal corresponds, for example, to the valid input flag 502; the valid output instruction signal corresponds, for example, to the valid output flag 592; the selector corresponds, for example, to the selector 110; the flip-flop corresponds, for example, to the flip-flop 120; the counter setting signal generation means corresponds, for example, to the counter setting signal generation unit 13; the first logical sum circuit corresponds, for example, to the logical sum circuit 130; the continuation period count constant corresponds, for example, to the continuation period count constant 103; the counter corresponds, for example, to the counter 140; the second logical sum circuit corresponds, for example, to the logical sum circuit 150; the latch input signal corresponds, for example, to the latch input signal 211; the third logical sum circuit corresponds, for example, to the logical sum circuit 210; the latch output signal corresponds, for example, to the latch output signal 311; the latch circuit corresponds, for example, to the latch circuit 310; and the logical product circuit corresponds, for example, to the logical product circuit 320.

The embodiments of the present invention can be applied, for example, to distributing of a clock to each block in an integrated circuit.

What is claimed is:

1. A clock control circuit for supplying a valid clock signal to a target circuit in, characterized in that:

if a valid input instruction signal changes from a disabled state to an enabled state, a supply of a clock signal to said target circuit starts in accordance with the system clock signal; and if a valid output instruction signal changes from the enabled state to the disabled state, a supply of said clock signal is stopped after a lapse of a period;

counter setting signal generation means for setting a counter setting signal to an enabled state during a period from when a valid input instruction signal indicating timings of data input to said target circuit changes from a disabled state to an enabled state to when a valid output instruction signal indicating timings of data output from said target circuit changes from the disabled state to the enabled state;

counter means being set with a continuation period count constant if said counter setting signal is in the enabled state immediately before said valid clock signal changes from a first state to a second state and for counting each time said valid clock signal changes from the first state to the second state;

count detection means for setting a continuation period signal to the enabled state until said counter means completely counts a number corresponding to said continuation period count constant after said continuation period count constant is set to said counter means;

enable signal generation means for setting a latch input signal to the enabled state if either said continuation period signal or said valid input instruction signal is in the enabled state;

latch means for outputting said latch input signal itself as a latch output signal if said system clock signal is in said first state, and if said system clock signal is in the second state, outputting as the latch output signal said latch input signal immediately before said system clock signal changes from said first state to said second state; and valid clock output means for outputting said system clock signal as said valid clock signal if said latch output signal is in the enabled state.

2. A clock control circuit for supplying a valid clock signal to a target circuit in accordance with a system clock signal, characterized by comprising:

a selector for outputting as a select signal a valid input instruction signal indicating timings of data input to said target circuit if a select control signal is in a disabled state and for outputting as said select signal an inverted signal of a valid output instruction signal indicating timings of data output from said target circuit if said select control signal is in an enabled state;

a flip-flop for holding said select signal immediately before said system clock signal changes from a first state to a second state and outputting said select signal as said select control signal;

a first logical sum circuit for setting a counter selling signal to the enabled state if any one of said valid input instruction signal, said valid output instruction signal and said select control signal is in the enabled state;

a counter for being set with a continuation period count constant if said counter setting signal is in the enabled state immediately before said valid clock signal changes from said first state to said second state, and for decrementing said set continuation period count constant each time said valid clock signal changes from the first state to the second state;

a second logical sum circuit for setting a continuation period signal to the disabled state if a value set to said counter is zero, and for setting said continuation period signal to the enabled state if said continuation period signal is not zero;

a third logical sum circuit for setting a latch input signal to the enabled state if either said continuation period signal or said valid input instruction signal is in the enabled state;

a latch circuit for outputting said latch input signal itself as a latch output signal if said system clock signal is in said first state, and for outputting as the latch output signal said latch input signal immediately before said system clock signal changes from said first state to said second state if said system clock signal is in said second state; and a logical product circuit for outputting said system clock signal as said valid clock signal if said latch output signal is in the enabled state.

3. An integrated circuit characterized by comprising:

a target circuit for receiving input data and a valid input instruction signal indicating input timings of said input data and outputting output data and a valid output instruction signal indicating output timings of said output data, synchronously with a valid clock;

a selector for outputting as a select signal said valid input instruction signal if a select control signal is in a disabled state and outputting as said select signal an inverted signal of said valid output instruction signal if said select control signal is in an enabled state;

a flip-flop for holding said select signal immediately before a system clock signal changes from a first state to a second state and outputting said select signal as said select control signal;

a first logical sum circuit for setting a counter setting signal to the enabled state if any one of said valid input instruction signal, said valid output instruction signal and said select control signal is in the enabled state;

a counter for being set with a continuation period count constant if said counter setting signal is in the enabled state immediately before said valid clock signal changes from said first state to said second state, and for decrementing said set continuation period count constant each time said valid clock signal changes from the first state to the second state;

a second logical sum circuit for setting a continuation period signal to the disabled state if a value set to said counter is zero, and for setting said continuation period signal to the enabled state if said continuation period signal is not zero;

a third logical sum circuit for setting a latch input signal to the enabled state if either said continuation period signal or said valid input instruction signal is in the enabled state;

a latch circuit for outputting said latch input signal itself as a latch output signal if said system clock signal is in said first state, and for outputting as the latch output signal said latch input signal immediately before said system clock signal changes from said first state to said second state if said system clock is in said second state; and a logical product circuit for outputting said system clock signal as said valid clock signal if said latch output signal is in the enabled state.

4. The integrated circuit according to claim 3, characterized in that:

said target circuit always sets said valid output instruction signal to the enabled state during a period while valid data is output.

5. The integrated circuit according to claim 3, characterized in that:

said target circuit sets said valid output instruction signal to the enabled state during a period while at least last data is output in the period while the valid data is output.

6. The integrated circuit according to claim 3, characterized in that:

said target circuit sets said valid output instruction signal to the enabled state at a timing retroactive by a predetermined period from a last of the period while the valid data is output, and said predetermined period being determined from said continuation period count constant.

* * * * *